United States Patent Office 3,322,594
Patented May 30, 1967

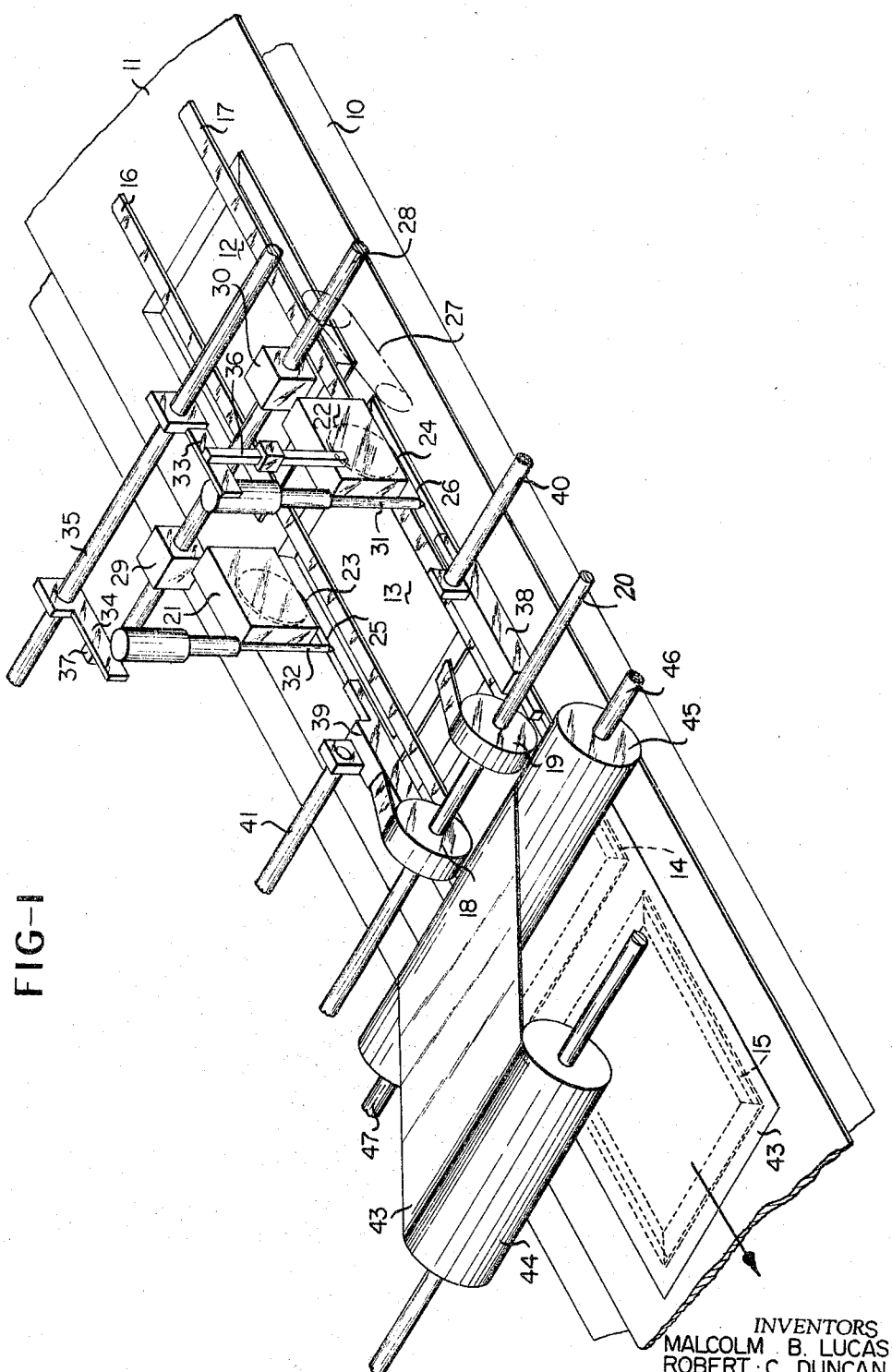

3,322,594
METHOD OF CONTROLLING THE BOND BETWEEN A PAD AND A PLASTIC SHEET
Malcolm B. Lucas, Cincinnati, Robert C. Duncan, Wyoming, and Leonard H. Sedlin, Springfield Township, Hamilton County, Ohio, assignors to The Procter & Gamble Company, Cincinnati, Ohio, a corporation of Ohio
Filed Mar. 8, 1963, Ser. No. 263,950
4 Claims. (Cl. 156—308)

This invention relates to the bonding of two dissimilar materials. More particularly, it relates to a method of bonding a pad to a plastic sheet under conditions which control the bond strength within desired limits.

Disposable diapers of the kind described and claimed in the patent of Robert C. Duncan et al., which issued on Apr. 27, 1965 as Patent No. 3,180,355 assigned to the assignee of the present invention, are comprised essentially of an absorbent pad and an outer sheet of plastic. After the diaper is used, the pad and plastic sheet are separated so that the pad can be flushed down the bowl of a water closet and the plastic sheet disposed of by some other means. Therefore, it is important in the manufacture of such diapers that the bond between the absorbent pad and the plastic sheet be controlled within proper limits so that a bond is formed which is strong in shear (so that the shear stresses encountered in use do not cause separation); and yet the bond must be weak enough in peel strength so that the pad and sheet can be readily separated after the diaper has been used.

It is an object of this invention to provide a method for bonding an absorbent pad to a plastic sheet whereby the bond strength is controlled so that it is strong in shear strength and weak in peel strength.

Another object of the invention is the provision of a method for accomplishing the above purposes which is adapted for use with the high speed machinery employed in the commercial manufacture of diapers as described in the Duncan et al. patent.

The nature and substance of the invention can be briefly summarized as a method of adhering an absorbent pad to a plastic sheet including the steps of applying a plasticized thermoplastic adhesive to the absorbent pad in a narrow bead substantially above room temperature, treating the adhesive with a fine, atomized water spray, and thereafter pressing together the absorbent pad and the plastic sheet after the temperature of the adhesive has been substantially reduced to form a bond that is strong in shear strength and weak in peel strength.

While the specification concludes with claims particularly pointing out and distinctly claiming the subject matter regarded as forming the present invention, it is believed the invention will be better understood from the following description taken in connection with the accompanying drawing in which:

FIGURE 1 is a diagrammatic isometric view showing those portions of one apparatus that can be used in carrying out the method of the invention.

Referring now to the drawing, it will be noted that a table 10 is provided which is suitably supported by the frame (not shown) of a machine. A conveyor belt 11 passes over the table 10 and is used to carry forward the pads 12, 13, 14 and 15 which are substantially equally spaced on the belt 11. The pads may be absorbent pads of the same type and structure as described in the previously cited Duncan et al. patent. However, it is not essential that the pads be absorbent in order to practice the inventive concept disclosed and claimed herein.

A pair of endless, hold-down belts 16 and 17 contact the pads, 12, 13, and 14 and hold them against the belt 11 to positively move them toward the adhesive applicator section. The belts 16 and 17 pass over the pulleys 18 and 19, respectively, which are supported on the shaft 20 which in turn is suitably journaled in the frame (not shown) of the machine. The other end of the belts 16 and 17 are similarly supported as will be appreciated by those skilled in the art.

A pair of adhesive applicators 21 and 22 having adhesive applicator wheels 23 and 24, respectively, are mounted to apply narrow beads 25 and 26 of adhesive to successive pads. As shown in the drawing, the beads are being applied to the pad 13. The applicator wheels 23 and 24 are constantly rotated by a conventional drive 27 (shown schematically) from the shaft 28 which is supported in the bearings 29 and 30. The thickness of the pads is such that the applicator wheels 23 and 24 do not contact the belt 11 in the spaces between successive pads.

A pair of water spray nozzles 31 and 32 supported from the cross members 33 and 34 which are attached to the shaft 35 are also provided. The nozzles 31 and 32 have small openings at their lower ends directed toward the beads 25 and 26 so that a fine stream of atomized water is sprayed on the thermoplastic adhesive for the purpose of treating it to control the nature of the ultimate bond. The nozzles are fed from suitable water and air sources (not shown). Some of the water may be deflected from the beads to the pad but such deflected water does not affect the nature of the ultimate bond. The water is sprayed continuously so that the belt is moistened in the area between pads but this does not have any adverse affect on the practice of the method.

The adhesive applicators 21 and 22 are supported from the members 36 and 37 which are attached to the cross members 33 and 34. Thus, on rotation of the shaft 35, the adhesive applicators and the water spray nozzles can be raised away from their application position when desired, for example, as when the process is to be interrupted momentarily or if adjustments are to be made.

Auxiliary cooling means in addition to the water spray may also be employed. For example, a pair of air nozzle blocks 38 and 39 having slotted openings (not shown) in the bottom portions thereof can be used to direct a cool stream of air against the beads. The air nozzle blocks are supplied from the conduits 40 and 41 and are used to cool the bead of molten plastic adhesive prior to its being adhered to the plastic sheet. The air supplied to the conduits 40 and 41 may be at room temperature or it may be chilled by the use of a conventional heat exchanger.

The plastic sheet 43 is suitably withdrawn from a roll 44 which is supported on the frame (not shown) of the machine. The plastic sheet preferably is a low density, opaque polyethylene web although equivalents thereof can be used with equally good results. Best results have been obtained with an embossed polyethylene sheet because the bond strength between the pad and the sheet is improved by producing a lower peel strength without loss of shear strength. The thickness of the polyethylene web may be as great as .005″ although the preferred thickness is .001″. The plastic sheet 43 passes over the roll 45. The roll 45 may, if desired, be chilled to provide a further cooling means for the adhesive bead. This cooling may be accomplished by supplying a coolant such as brine through a central conduit 46. The coolant is removed through the outlet conduit 47. The roll 45 presses the plastic sheet 43 against the successive pads. In the drawing, the plastic sheet 43 is being applied against the pad 14 after the adhesive beads 25 and 26 have been treated by the water spray from the nozzles 31 and 32.

As previously stated, air from the nozzle blocks 38 and 39 may also be directed toward the beads 25 and 26 in addition to the water spray. In some cases, chilling of the sheet 43 has a further beneficial effect in controlling of the bond between the plastic sheet 43 and the pads but only when used with the previously described water spray or in combination with the water spray and the air cooling.

In practice, it has been found that the pad and sheet can be adhered by the use of a plasticized polyethylene adhesive such as that sold by National Starch and Chemical Corporation and identified as National Starch Resyn #34–3000. This adhesive is applied in beads about 1/16″–1/8″ wide at a temperature of approximately 250° F. The water spray treats the adhesive and also cools it rapidly to an over-all temperature of approximately 110°–140° F. at which time the pad and the plastic sheet are bonded together. The necessity of specifically treating the adhesive with a water spray has been found to be very important for controlling the bond between the plastic sheet and the pad so that the desired high shear strength and easy severability by peeling is attained.

Initial peel strength as determined by a Schopper tensile tester should be in the range of about 20–50 grams for each adhered bead. After peeling has been initiated, the peeling force will be reduced about 10–20 grams. The shear strength of each adhered bead should be no less than 400 grams per inch; but preferably it should be limited only by the strength of the plastic sheet which is in the range of 500–600 grams per inch for the preferred polyethylene previously mentioned herein.

It has been found that the practice of the present invention achieves its objectives at production speeds of 100 diapers per minute and up.

As previously stated, the air cooling can be used as a supplement to the water spray in cooling the molten adhesive strips. Alternatively, the plastic sheet can be chilled prior to being adhered to the water-sprayed bead on the pad. As a last alternative, all means of treating and/or chilling can be used, i.e. the molten bead can be subjected to a water spary and air cooling while the plastic sheet is simultaneously chilled.

Example

Absorbent pads of the type described in the patent of Robert C. Duncan et al., issued on Apr. 27, 1965 as Patent No. 3,180,355, are advanced by the conveyor belt at a speed of 150 feet per minute. The pads are 15″ long x 12½″ wide by .05″ thick. They are spaced 2″ apart on the conveyor belts and are moved in the direction of the long dimension. As the pads are moved by the conveyor belts, a 1/8″ wide plasticized polyethylene adhesive bead is applied parallel to the side edges of the pads. The adhesive bead is .007″ thick; .002″ protruding above the pad surface and .005″ being absorbed by each pad. The beads are spaced ¼″ inwardly from each edge and are applied at a temperature of 250° F. The plasticized polyethylene adhesive is a National Starch Resyn #34–3000 as sold by the National Starch and Chemical Corporation. Each adhesive bead is treated with an atomized water spray from a Paasche model A–AUD automatic spray nozzle having a type AXR needle valve opening as made by the Paasche Airbrush Company of Chicago 14, Ill. Each nozzle is supplied with water at a temperature of 70° F. and at a pressure of 35 p.s.i.g. Each nozzle is supplied with ½ CFM air at 35 p.s.i.g. pressure in order to atomize the water. A spray of water of 0.5 grams/pad/bead is applied. The beads cool to a temperature of 125° F. Thereafter, an embossed, .001″ thick x 16″ wide polyethylene web is pressed against the absorbent pads and is adhered to the cooled, water treated beads. This results in a peel strength for each bead as determined by a Schopper tensile tester of 33 grams to initiate peeling and 21 grams to continue peeling after it has been initiated. The shear strength of the bonds is 550 grams per inch.

While particular embodiments of the invention have been illustrated and described it will be obvious to those skilled in the art that various changes and modifications can be made without departing from the spirit and scope of the invention and it is intended to cover in the appended claims all such changes and modifications that are within the scope of this invention.

What is claimed as new is:

1. The process for bonding a plastic film to an absorbent pad comprising the steps of applying a narrow molten bead of a plasticized polyethylene adhesive to the pad, subjecting said bead to a fine, atomized water spray to rapidly reduce the temperature of the adhesive bead to a temperature in the range of from about 110° F. to about 140° F., thereafter and pressing together the plastic film and the absorbent pad in the area of the adhesive to produce a bond between the plastic film and the absorbent pad which has a shear strength of at least 400 grams per inch and an initial peel strength of from about 20 to about 50 grams per bead which is reduced to a peel strength of from about 10 to about 20 grams per bead after peeling has been initiated.

2. The process for bonding a plastic film to an absorbent pad as claimed in claim 1 including the step of directing a jet of cooling air on the molten bead after it has been treated with the water spray and before the plastic film and the absorbent pad are pressed together.

3. The process for bonding a plastic film to an absorbent pad as claimed in claim 1 including the step of chilling the plastic film before it is pressed together with the absorbent pad.

4. The process for bonding a plastic film to an absorbent pad as claimed in claim 2 including the step of chilling the plastic film before it is pressed together with the absorbent pad.

References Cited
UNITED STATES PATENTS

| | | | |
|---|---|---|---|
| 2,513,106 | 6/1950 | Prendergast | 156—244 |
| 2,578,664 | 12/1951 | Beery et al. | 156—200 |
| 2,932,385 | 4/1960 | Bollmeier et al. | 206—47 |
| 2,962,843 | 12/1960 | Hoelzer et al. | 156—244 |
| 3,008,862 | 11/1961 | Haine et al. | 156—244 |
| 3,008,863 | 11/1961 | Morris et al. | 156—578 |
| 3,138,514 | 6/1964 | Florio | 161—129 |
| 3,150,024 | 9/1964 | Penman | 156—282 |

EARL M. BERGERT, *Primary Examiner.*

J. P. MELOCHE, *Assistant Examiner.*

UNITED STATES PATENT OFFICE
CERTIFICATE OF CORRECTION

Patent No. 3,322,594                                         May 30, 1967

Malcom B. Lucas et al.

It is hereby certified that error appears in the above numbered patent requiring correction and that the said Letters Patent should read as corrected below.

Column 3, line 35, for "spary" read -- spray --; column 4, line 24, strike out "thereafter".

Signed and sealed this 26th day of December 1967.

(SEAL)
Attest:

Edward M. Fletcher, Jr.                                    EDWARD J. BRENNER
Attesting Officer                                               Commissioner of Patents